US007374342B2

(12) United States Patent
Yum et al.

(10) Patent No.: US 7,374,342 B2

(45) Date of Patent: May 20, 2008

(54) HYDRODYNAMIC FLUID FILM BEARING AND BEARING HOUSING WITH COOLING CAPACITY

(75) Inventors: Byung-yong Yum, Changwon-si (KR); Se-hoon Cho, Seongnam-si (KR)

(73) Assignee: Samsung Techwin Co., Ltd. (KR)

( * ) Notice: Subject to any disclaimer, the term of this patent is extended or adjusted under 35 U.S.C. 154(b) by 322 days.

(21) Appl. No.: 11/168,618

(22) Filed: Jun. 27, 2005

(65) Prior Publication Data

US 2006/0018575 A1 Jan. 26, 2006

(30) Foreign Application Priority Data

Jul. 27, 2004 (KR) ...................... 10-2004-0058797
Jul. 26, 2005 (KR) ...................... 10-2004-0058365

(51) Int. Cl.
*F16C 32/06* (2006.01)

(52) U.S. Cl. ...................................................... 384/106

(58) Field of Classification Search ................ 384/103, 384/106

See application file for complete search history.

(56) References Cited

U.S. PATENT DOCUMENTS 3,434,761 A * 3/1969 Marley ....................... 384/103
3,511,544 A * 5/1970 Marley ........................ 384/12
3,893,733 A * 7/1975 Silver et al. ................ 384/106
4,178,046 A * 12/1979 Silver et al. ................ 384/103
4,262,975 A 4/1981 Heshmat et al. ............... 308/9
4,465,384 A 8/1984 Heshmat et al. ............ 384/106
5,427,455 A 6/1995 Bosley ....................... 384/106
6,158,893 A 12/2000 Heshmat ..................... 384/106
6,527,446 B2 * 3/2003 Lee et al. ..................... 384/99
2003/0012466 A1 * 1/2003 Shimizu et al. ............. 384/103
2004/0042691 A1 * 3/2004 Matsunaga .................. 384/103

* cited by examiner

*Primary Examiner*—Thomas R Hannon
(74) *Attorney, Agent, or Firm*—Tuchman & Park LLC

(57) ABSTRACT

A hydrodynamic fluid film bearing for supporting a rotation shaft of a turbo or rotary apparatus includes a sleeve having a circular inner opening for receiving a rotation shaft therein, at least one metallic foil member of arc shape having one end fixed to the inner surface of the sleeve and arranged along the inner opening of the sleeve, and at least one elastic member disposed at the sleeve between the sleeve and the foil member. A bearing housing for receiving a bearing of a rotary apparatus is further provided, in which the bearing housing includes a circular opening for receiving the bearing therein, and the circular inner opening of the bearing housing includes grooves for cooling air passage formed at regular interval in the axial direction on the inner surface of the bearing housing. The bearing received in the bearing housing is preferably a hydrodynamic fluid film bearing.

15 Claims, 5 Drawing Sheets

HYDRODYNAMIC FLUID FILM BEARING AND BEARING HOUSING WITH COOLING CAPACITY

RELATED PATENT APPLICATION

This application claims priority of Korean Patent Applications No. 10-2004-0058365, filed on Jul. 26, 2004, and No. 10-2004-0058797, filed on Jul. 27, 2004, in the Korean Intellectual Property Office, the disclosures of which are incorporated herein in their entirety by reference.

BACKGROUND OF THE INVENTION

1. Field of the Invention

The present invention relates to a cooling system for a turbo or rotary apparatus, more particularly, to a hydrodynamic fluid film bearing, and a bearing housing containing a bearing therein for a turbo or rotary apparatus, in which the bearing includes foil members and/or cooling passages such as grooves formed about the bearing for effectively cooling the bearing or rotator shaft of the apparatus.

2. Description of the Related Art

A hydrodynamic fluid film bearing is known in the art, which is typically used to support a rotor shaft in a turbo or rotary machine such as a compressor, a blower, a motor, a generator, and other rotary apparatus or the like. Contrary to a conventional ball bearing or a journal bearing for supporting a rotor shaft, which typically uses an oil film as a lubricant and cooling medium for the rotor, the hydrodynamic fluid film bearing for a rotor shaft utilizes a high pressure air layer between the bearing and the rotor shaft. The hydrodynamic fluid film bearing is effective to support a rotor in particular for a small sized and light weighted turbo apparatus, which rotates at a high speed of 50,000 RPM to 150,000 RPM, for example.

FIG. 1 is a sectional view of one example of a conventional hydrodynamic fluid film bearing for supporting a rotor with an air layer formed between the bearing and the rotor for cooling heat generated in the apparatus.

Referring to FIG. 1, the hydrodynamic fluid film bearing of this type has a sleeve shape, and a rotation shaft 1 is received in a hollow inner space of the hydrodynamic fluid film bearing. When the rotation shaft 1 rotates, a gap G of typically 3 to 10 μm is formed between a bearing sleeve 20 and the rotation shaft 1. Because the rotation shaft 1 rotates in high speed with the fine gap G formed between the bearing sleeve 20 and the rotation shaft 1, a large amount of heat generated between the bearing sleeve 20 and the rotation shaft 1 cannot effectively be discharged from the apparatus.

To address this concern, various attempts have been made in which compressed air is forced into the gap G between the bearing sleeve 20 and the rotation shaft 1 for passing through the gap G in order to dissipate the heat. However, the compressed air circulating through the fine gap G cannot often effectively dissipate the overheating caused by high speed rotation of the rotation apparatus.

FIG. 2 is a sectional view of another example of a known hydrodynamic fluid film bearing. Referring to FIG. 2, hydrodynamic fluid film bearing 10 includes a sleeve 11 having a circular inner cavity 12 in which a rotation shaft 1 is rotatably received, and elastic metal foils 21 arranged at the hollow cavity 12 between the sleeve 11 and the rotation shaft 1.

The elastic metal foils 21 are arranged on the inner wall surface of the sleeve 11 typically partially overlapping one another. In this manner, one end of each metal foil 21 is fixed to an inner surface 11*a* of the sleeve 11 and the other end, which overlaps with an adjacent metal foil 21, generally contacts with the outer surface of the rotation shaft 1. As shown in the figure, the metal foil 21 can be fixed to the sleeve 11 with one end of the metal foil 21 inserted in a slot 13 formed on the inner surface 11*a* of the sleeve 11 and fixed with a fixing member 22 in the slot 13.

When the rotation shaft 1 rotates in the hollow opening 12 of the sleeve 11 at a certain speed, an air layer of high pressure is formed between the rotation shaft 1 and the metal foils 21. The rotation shaft 1 floats in the air due to the air pressure and rotates while maintaining a uniform distance from inner surface of the sleeve 11. Here, the metal foils 21 operate typically as a damper in supporting the rotation shaft 1.

However, if the rotation shaft 1 vibrates or trembles severely due to an external impact, for example, the rotation shaft 1 may be pushed against the metal foils 21 of the sleeve 11, causing damages to the sleeve 11 and the foils 21.

In order to solve such a problem, the metal foils may be overlapped one another to form multi-layered metal foils. However, such metal foils are typically not effective to provide adequate damping properties or supports to the rotation shaft in the presence of severe external impacts.

SUMMARY OF THE INVENTION

The present invention provides a cooling system for a turbo or rotary apparatus, in which the cooling system comprises a cooling structure adapted to provide an adequate cooling performance to a bearing of the rotary apparatus, especially for the bearing generating a large amount of heat in the bearing by rotation of a rotation shaft received in the bearing such as an hydrodynamic fluid film bearing. The present invention further provides a bearing housing for providing an adequate cooling performance to a bearing retained therein. The present invention also provides a hydrodynamic fluid film bearing for supporting a rotation shaft therein, in which the bearing can provide adequate damping properties and effectively support the rotation shaft even when it is subject to severe external impacts.

According to one aspect of the present invention, a hydrodynamic fluid film bearing for a rotary or turbo apparatus comprises: a sleeve having a circular inner opening for receiving a rotation shaft therein, at least one foil member having one end fixed to the inner surface of the sleeve and arranged along the inner opening of the sleeve, and at least one elastic member disposed at the sleeve between the sleeve and the foil member.

The hydrodynamic fluid film bearing preferably includes a cooling groove formed at the inner surface of the sleeve along the elastic member. The elastic member of the hydrodynamic fluid film bearing has an end portion protruding toward the inner opening of the sleeve.

The hydrodynamic fluid film bearing preferably comprises a plurality of foil members arranged along the inner opening of the sleeve with portions of the foil members partially overlapping with one another. The foil members are preferably formed of metal, having a generally arc shape.

The elastic member is preferably fixed to the sleeve with a support member engaged there-between, with the support member securing a lower portion of the elastic member. The elastic member has a viscous property to endure a shearing force applicable to the elastic member by the rotation shaft. The elastic member advantageously includes a covering member of abrasion resistance property disposed on an upper surface of the elastic member.

According to one aspect of the present invention, a bearing housing for receiving a bearing of a rotary apparatus, comprises a circular opening for receiving a bearing and thereby defining a circular inner surface in the bearing housing, wherein the circular inner surface includes grooves for air passage formed at regular interval on the inner surface of the bearing housing.

The grooves of the bearing housing are preferably formed in the longitudinal direction of the bearing housing. The bearing housing preferably includes a plurality of key grooves formed at one end of the bearing housing to support a tangential force generated by the rotation of a rotation shaft of the rotary apparatus when the bearing housing is assembled with the rotary apparatus. The bearing housing may further include a flange for connecting the bearing housing to an external structure of the rotary apparatus.

The bearing in the bearing housing is preferably a hydrodynamic fluid film bearing.

According to still another aspect of the present invention, a cooling system for reducing heat in a bearing of a rotary apparatus comprises: a bearing housing having a circular opening for receiving a bearing therein, and grooves for air passage formed on the inner surface of the bearing housing in a generally axial direction of the bearing housing, in which the groves for air passage are configured to pass compressed air for reducing heat in the bearing.

The bearing of the cooling system is preferably a hydrodynamic fluid film bearing, and the hydrodynamic fluid film bearing is configured to receive a rotation shaft of the rotary apparatus, in which the rotation shaft rotating in the bearing includes an air gap defined between the rotation shaft and the bearing, and the air gap is further configured to pass the compressed air there-through.

BRIEF DESCRIPTION OF DRAWINGS

The above and other aspects, features and advantages of the present invention will become more apparent by exemplary embodiments thereof described in detail with reference to the attached drawings in which.

DETAILED DESCRIPTION OF PREFERRED EMBODIMENTS

Figure 3:
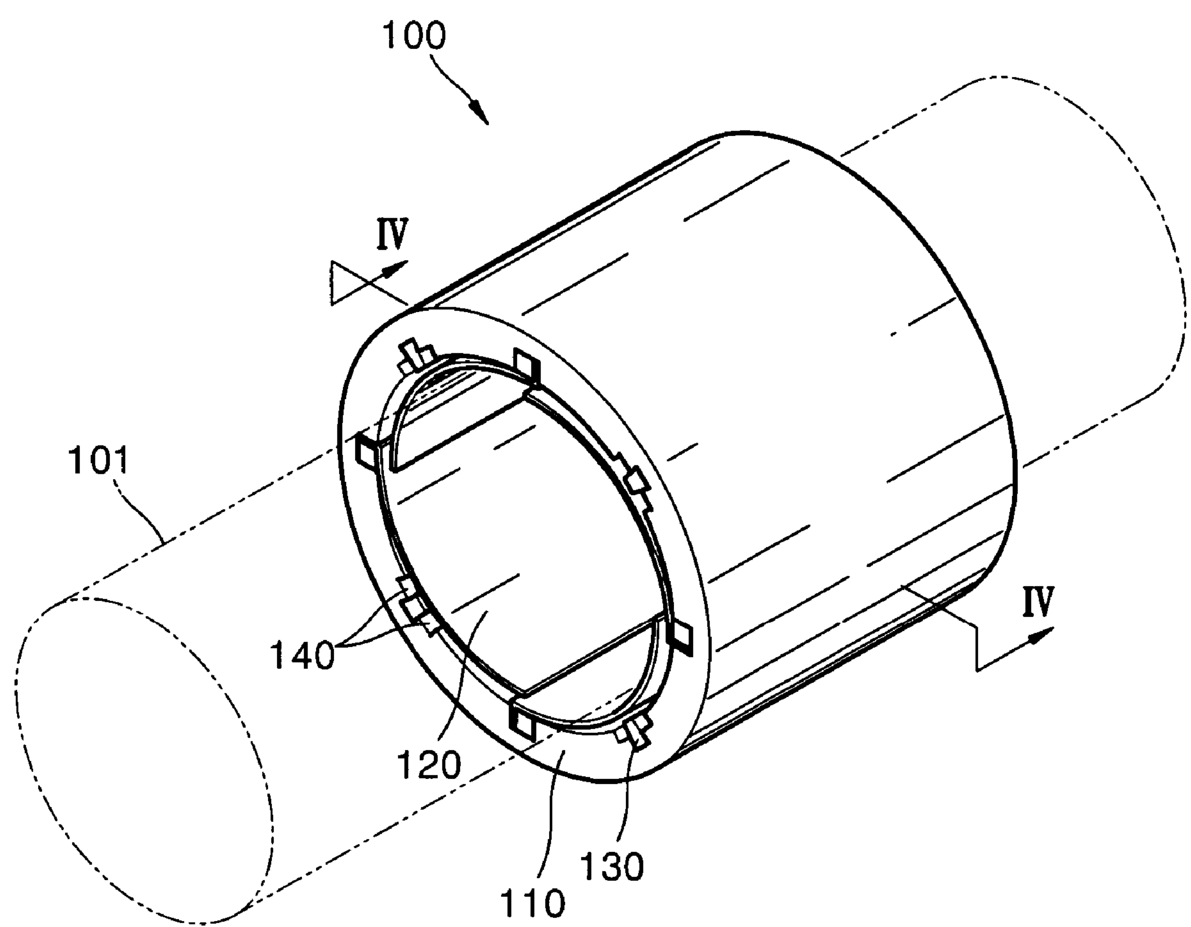
FIG. 3 is a perspective view of a hydrodynamic fluid film bearing according to one embodiment of the present invention.
Figure 4:
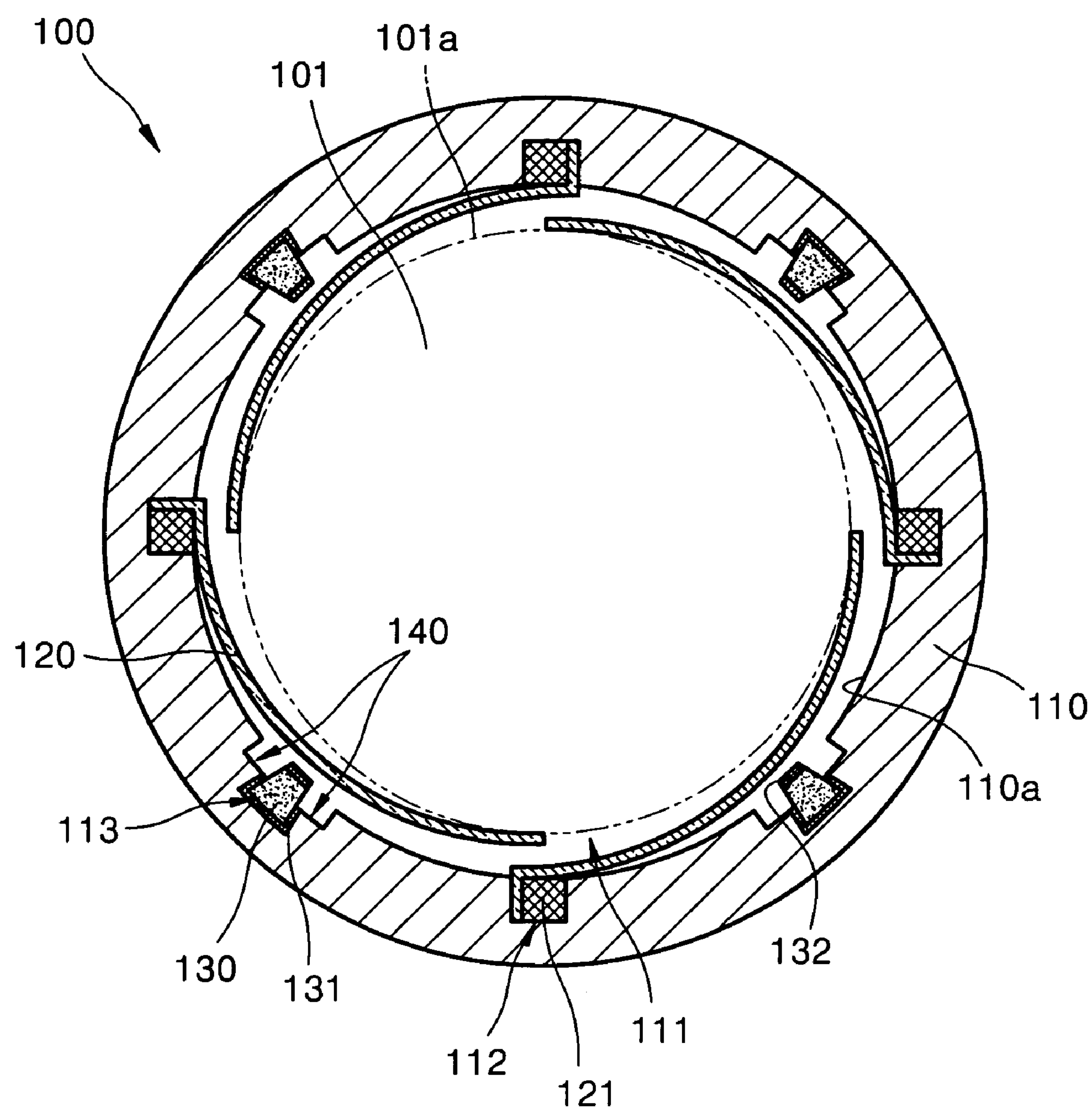
FIG. 4 is a sectional view of the hydrodynamic fluid film bearing, taken along the line IV-IV of FIG. 3.

FIG. 3 is a perspective view of a hydrodynamic fluid film bearing according to one embodiment of the present invention, and FIG. 4 is a sectional view of the hydrodynamic fluid film bearing according to the embodiment taken along the line IV-IV of FIG. 3.

Referring to FIGS. 3 and 4, hydrodynamic fluid film bearing 100 according to this embodiment includes a bearing sleeve 110 for receiving a rotation shaft 101 therein, and plural metal foils 120 fixedly arranged between the sleeve 110 and the rotation shaft 101.

The sleeve 110 is formed in a circular shape having a circular opening 111 for receiving the rotation shaft 101 therein. The diameter of the hollow opening 111 is larger than the diameter of the rotation shaft 101 for displacing an inner surface **110*a* of the sleeve 110 from an outer circumference 101*a* of the rotation shaft 101, which rotates within the circular opening 111**.

A plural number of metal foils 120 are fixed along the circular opening 111 of the sleeve 110. The metal foils 120 have an elastic characteristic to operate as a damper or a sliding guide for slidably supporting the rotation shaft 101, and the metal foils 120 are formed in a plate or sheet-like shape to reduce heat and abrasion caused by rubbing against the rotation shaft 101. A coating material is preferably covered on the metal foils 120 for making them slide smoothly on the rotation shaft 101 and reducing abrasive frictions there-between.

In order to improve the damping and sliding performance of the metal foils 120, the metal foils 120 are bent generally in an arc shape having a curvature with their free ends approaching to the proximity of or in contact against the outer surface of the rotation shaft 101. As shown, one end of each metal foil 120 is fixed to the inner surface **110*a* of the sleeve 110 in the circular opening 111 while the other end of the metal foil 120 is displaced from the inner surface 110*a* of the sleeve 110**.

In order to fix the metal foils 120 to the inner surface **110*a* of the sleeve 110, slots 112 are formed along the inner surface 110*a* of the sleeve 110 with intervals. One end of each metal foil 120 is bent at an angle and inserted in the slot 112, and a fixing member 121 is press fit in the slot 112 for firmly fixing the end of the metal foil 120 at the slot 112. As a result, the metal foil 120 is securely affixed to the inner surface 110*a* of the sleeve 110. However, the metal foils 120 can be connected to inner surface of the sleeve 110** in other manners known in the art.

The length of the metal foils 120 extending in the circumferential direction is preferably set to partially overlap with the fixed ends of adjacent metal foils 120 for enhancing the efficiency and function of the bearing.

According to one preferred embodiment of the present invention, at least one elastic member 130 is disposed along the inner surface **110*a* between the sleeve 110 and each of the metal foil 120. The elastic member 130 is formed of a resilient and elastic material for providing cushioning supports to the metal foils 120, and preferably has a viscosity of for providing a dynamic stability against a shear force, in particular. Thus, the elastic member 130 (which is preferably viscous) can effectively support the metal foils 120 while elastically transforming its shape when impacts are applied onto the metal foils 120. An example of the viscous and elastic member 130** includes a polymer material formed of acryl.

When an external impact is applied to the rotation shaft 101 to tremble the rotation shaft 101, the impact is transmitted to the metal foils 120 and the outer surfaces of the metal foils 120 contact the viscous and elastic members 130. Thus, the viscous, elastic members 130 can absorb the impact effectively.

Figure 5:
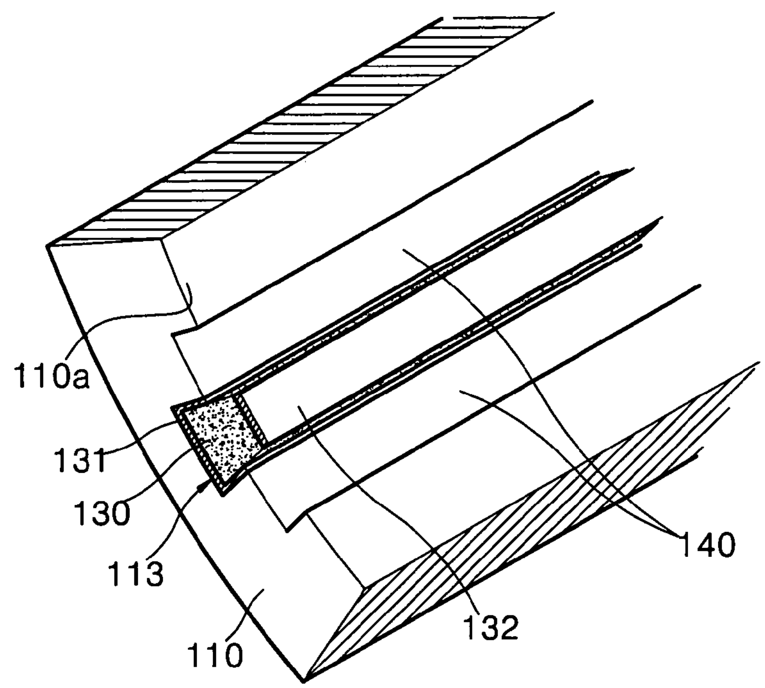
FIG. 5 is a perspective view of a portion of the hydrodynamic fluid film bearing of FIG. 3 showing the details of an elastic member.

More specifically, referring to FIG. 5, the viscous and elastic member 130 having a suitable dimension is arranged in the longitudinal direction of the sleeve 110, with one side of the viscous and elastic member 130 securely fixed at the inner surface 110*a* of the sleeve 110. In order to fix the elastic member 130 to the inner surface 110*a* of the sleeve 110, a slot 113 is formed on the inner surface 110*a* of the sleeve 110 in the longitudinal direction of the sleeve 110, and a support member 131 is securely engaged between the elastic member 130 and the slot 113. The support member 131 may surround a lower (i.e., outer) portion of the elastic member 130 for securing it. Due to the support member 131, the elastic member 130 can be securely affixed to the sleeve 110 and maintain its shape. However, the support member 131 may be omitted, and the elastic member 130 can be received directly in the slot 113.

With the lower side of the elastic member 130 fixed in the slot 113, the upper side of the elastic member 130 is protruding out from the slot 113 toward the outer surface of the metal foil 120. The height of the elastic member 130 is set to be protruding to a certain degree toward the center of the sleeve 110 from the inner surface 110*a* of the sleeve 110, in order to provide suitable cushioning supports to the metal foils 120.

A covering member 132 may optionally be disposed on the upper surface of the elastic member 130 for protecting and covering the contact surface against the outer surface of the metal foil 120. The covering member 132 on the elastic member may be formed of a hard coating material of abrasion resistance, a heat-resistant film material, or other coating materials having suitable property.

The width of the protruding end portion of the elastic member 130 may be smaller than the width of the opposite end portion fixed in the slot 113 for elastic member, with the sectional shape of the elastic member 130 formed in a trapezoidal configuration. As a result, the elastic member 130 is prevented from escaping from the sleeve 110 even when a rotational (shearing) force is applied to the elastic member 130. In addition, since the area of the lower surface of the elastic member 130 is larger than the area of the upper surface, it may provide adequate cushioning supports to the metal foils 120. However, the sectional shape of the elastic member can be varied.

Because the elastic members 130 are placed at the sleeve 110 below the metal foils 120, heat is not transmitted from the metal foils 120 to the elastic members 130 under the normal operating condition. Therefore, the intrinsic characteristics and shape of the elastic member 130 can be maintained without damaging from the excessive heat.

In addition, it is more advantageous to make the elastic member 130 be cooled to a temperature lower than a threshold temperature not to be damaged by heat. In order to meet this concern, a cooling groove 140 is formed at the inner surface 110*a* of the sleeve 110 along the lateral sides of the elastic member 130 in the longitudinal direction. More specifically, the groove 140 is formed with a suitable width and depth and in parallel relation with the longitudinal direction of the slot 113, at both sides of the elastic member 130 including the area of the elastic member receiving slot 113. The grooves 140 operate as a cooling channel through which air can circulate for cooling the metal foils 120 and the sleeve 110. Accordingly, the elastic members 130 located in the cooling channel can be cooled to a temperature lower than a threshold degree. Thus, the shape and characteristics of the elastic member 130 can be maintained for an extended period of time.

The operation of the hydrodynamic fluid film bearing 100 according to the above-described embodiments of the invention is now described herein.

First, when the rotation shaft 101 rotates within the circular opening 111 of the sleeve 110 at a certain speed, an air layer of high pressure is formed between the rotation shaft 101 and the metal foils 120. Due to the high pressure of the air layer, the rotation shaft 101 rotates while floating in the air and maintaining a predetermined distance from the metal foils 120. During the rotation of the rotation shaft 101, the metal foils 120 are functioning as a damper and/or a cushioning guide, and prevent the rotation shaft 101 from directly contacting against the inner surface 110*a* of the sleeve 110. In addition, because the elastic or cushioning members 130 are placed at the inner surface 110*a* of the sleeve under the metal foils 120, the rotation shaft 101 is further prevented from directly contacting against the inner surface 110*a* of the sleeve 110, even when the rotation shaft 101 trembles by an external impact applied to the rotation shaft and pushing it to the metal foils 120. Accordingly, the rotation shaft 101 can rotate stably and without damaging the metal foils 120 or the sleeve 110.

Figure 6:
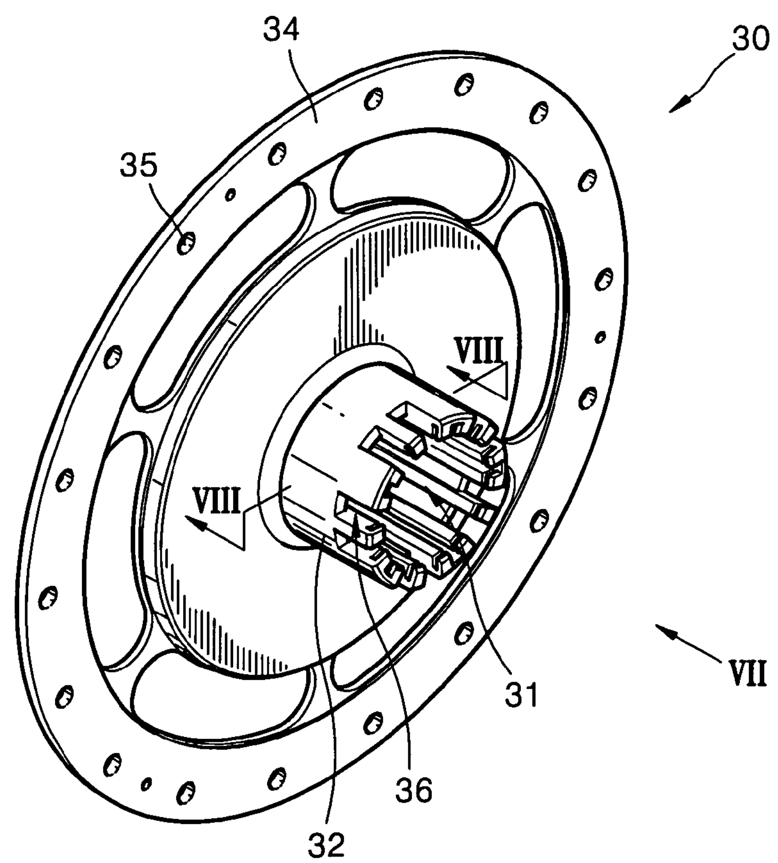
FIG. 6 is a perspective view of a bearing housing for a hydrodynamic fluid film bearing according to another embodiment of the present invention.

FIG. 6 is a perspective view of a bearing housing constructed according to one embodiment of the present invention. Referring to FIG. 6, a bearing housing 30 includes a bearing accommodating or housing unit 32 having a hollow opening 31 for receiving a bearing therein, and a flange 34 disposed around the circumference of the bearing accommodating unit 32.

The flange 34 is formed preferably in a circular shape, and has connection holes 35 formed around the flange 34 for connecting the bearing housing 30 with an external housing or suitable structure (not shown) of a rotary or turbo apparatus, such as a compressor, blower, motor, generator, or the like, which contains a rotor (e.g., the rotation shaft 101) rotating at a high speed. The connection holes 35 may be symmetrically formed along the circumference of the flange 34 with a uniform interval in order for the bearing housing 30 to evenly support the load when the bearing housing 30 is structurally connected with the external housing of the rotary apparatus. The shape of the bearing housing is not limited to a circular shape as shown in FIG. 6, and can be varied according to the shape of the external housing or structural member of the rotary apparatus to be combined and/or the location of a rotation shaft.

Spline key grooves 36 may be formed at a distal end of the bearing accommodating unit 32 of the bearing housing 30, for using when connecting with the external housing to support the rotational power.

Figure 7:
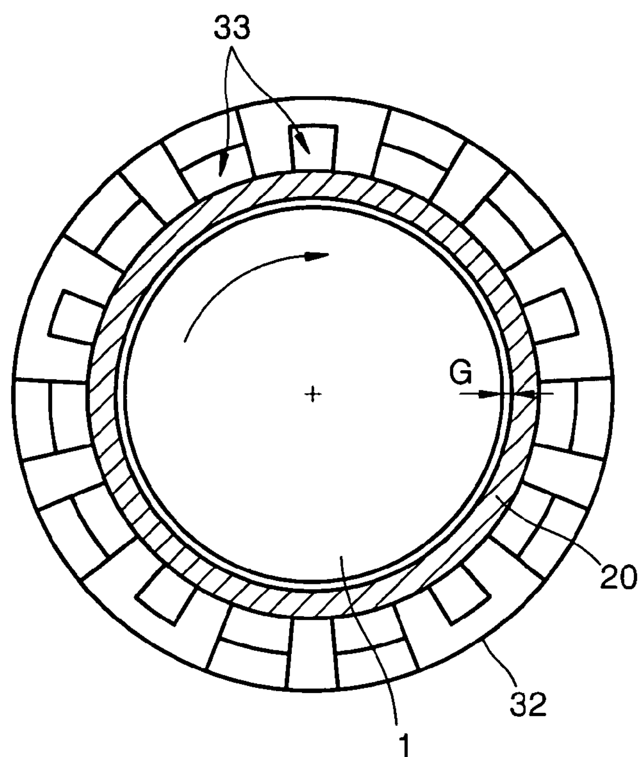
FIG. 7 is a front view of the bearing housing for a hydrodynamic fluid film bearing, taken from direction "VII" of FIG. 6 and further showing a hydrodynamic fluid film bearing assembled in the bearing housing.
Figure 8:
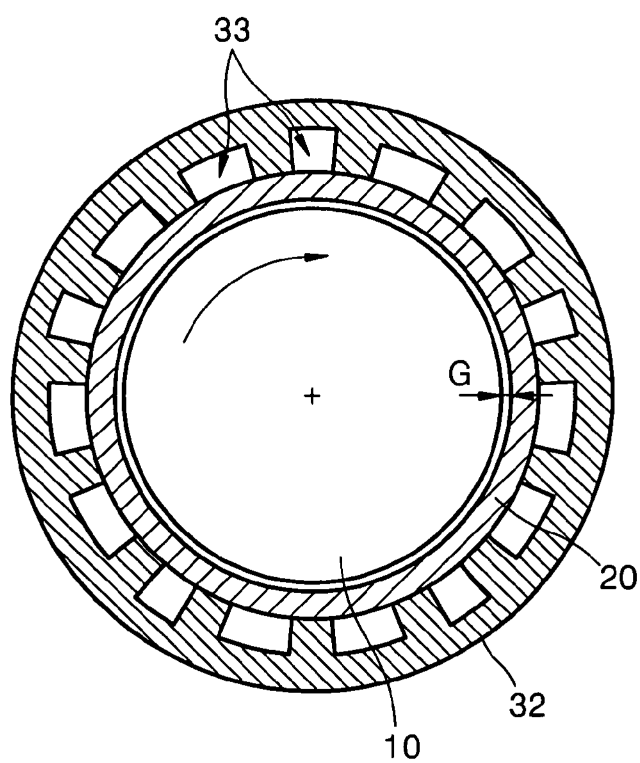
FIG. 8 is a sectional view of the bearing housing for a hydrodynamic fluid film bearing, taken along the line VIII-VIII of FIG. 6.

FIGS. 7 and 8 are sectional views illustrating the assembled state of a bearing with the bearing accommodating unit 32 of the bearing housing, with a rotation shaft of the rotary apparatus received in the bearing, constructed according to one embodiment of the present invention. More specifically, FIG. 7 illustrates a front view taken from the direction VII of FIG. 6, and FIG. 8 illustrates a sectional view taken along the line VIII-VIII of FIG. 6. Here, a conventional hydrodynamic fluid film bearing (without having metal foils affixed therein) is used for the bearing. However, the bearing is not limited to the particular types of the bearings as shown in the figures, and the hydrodynamic fluid film bearings of the invention shown in FIGS. 3 and 4, for example, can be also used for the bearing.

Referring to FIGS. 7 and 8, a plurality of air passages 33 (in form of grooves) are formed along the inner surface of the bearing accommodating unit 32. Since compressed air is supplied from an external compressed air source (not shown) to the air passages 33, the heat generated at the bearing 20 due to the rotation of the rotation shaft 1 in the bearing 20 can effectively be dissipated with the air. In addition, compressed air is also supplied to pass through air gap G provided between the inner surface of the bearing 20 and the rotation shaft 1 as described before. As a result, the compressed air passes through the air passages 33 formed along the outer surface of the bearing 20 and the air gap G formed at the inner surface of the bearing 20 at the same time, thus improving the cooling performance of the bearing housing.

The compressed air can be supplied by an external compressed air supplier source, or it can be supplied by utilizing the rotational force of the turbo or rotary apparatus in a manner to be contemplated by the person skilled in the art. For instance, in a turbo apparatus such as a compressor or a blower having a hydrodynamic fluid film bearing and a rotation shaft retained in the bearing housing of the present invention, the bearing can be located between an air inlet unit and an air outlet unit of the turbo apparatus. In this case, the compressed air can flow through the air channels formed the inner surface and outer surface of the bearing (such as bearing 20) as described above without providing an additional compressed air supplier. As a result, the cooling mechanism of such a bearing can be provided at a comparably low cost.

Figure 1:
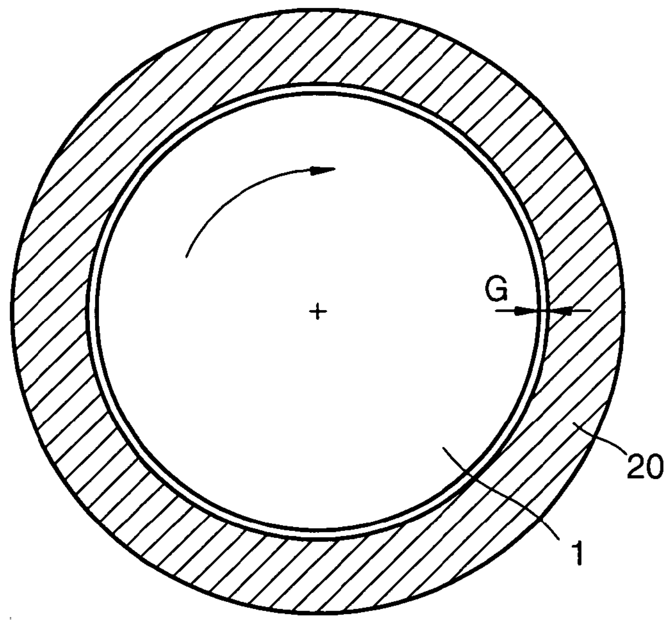
FIG. 1 is a sectional view of one example of a conventional hydrodynamic fluid film bearing having an air gap formed therein through which compressed air flows.
Figure 2:
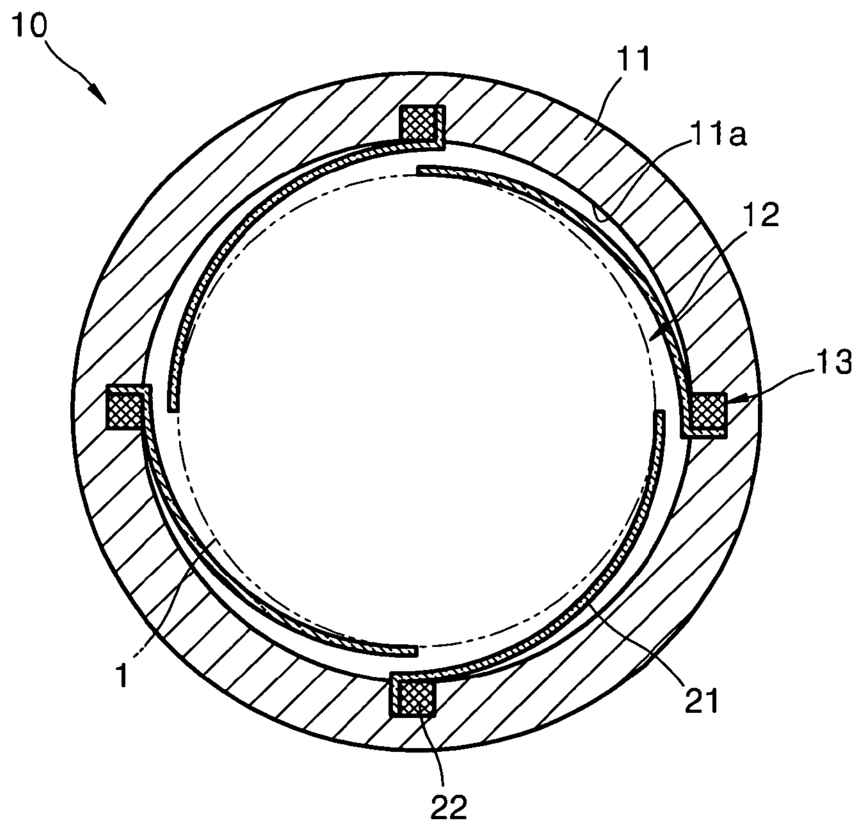
FIG. 2 is a sectional view of another example of a conventional hydrodynamic fluid film bearing with metallic foils affixed therein.

According to an experiment, in which a rotation shaft was received in a conventional hydrodynamic fluid film bearing (as shown in FIG. 1), and the rotation shaft was rotated at a speed of 60,000 to 100,000 rpm while supplying compressed air through the gap G of 3 to 10 μm formed between the shaft and the bearing, the temperature of the bearing went up to about 200° C. after a set period of time. However, according to the present invention, when utilizing the above-described cooling structure adopted in the bearing housing of the invention, the temperature of the bearing became about 150° C. after the same period of time, which is a temperature about 25% lower than that of the conventional cooling structure discussed above.

Referring again to FIGS. 7 and 8, the bearing 20 can be connected to the circular opening of the bearing accommodating unit 32 of the bearing housing 30 with a tolerance between the bearing housing 30 and the bearing 20 being smaller than the gap between the bearing 20 and the rotation shaft 1 in the rotating state, or it can fixed thereto with press-fit or lose-fit.

As described above, when the hydrodynamic fluid film bearings are used as the bearing 20, the compressed air is supplied to the gap G while the rotation shaft 1 is rotating, and at the same time the compressed air is also supplied through the air passages 30, in order to effectively reduce the heat generated at the bearing 20 by rotation of the rotation shaft 1 received therein. However, when other bearings than the hydrodynamic fluid film bearing are used for the bearing 20, the compressed air can optionally be supplied only through the air passages 33, but not through the gap between the bearing 20 and the rotation shaft 1, in order to reduce the heat.

In addition, because the sidewall portions of the air passages grooves 33 contact with the bearing 20, they can function as cooling fins, and thus further improve the cooling performance of the bearing.

According to the invention as described above, elastic (and preferably viscous) members are positioned at the inner surface of the sleeve, thus an external impact applied to a rotation shaft can be absorbed effectively. In addition, since cooling passages are formed along the elastic members, the elastic members can maintain their designed shape and characteristics and be useable over an extended period of time without losing their intended property. Accordingly, the rotation stability of the rotation shaft is improved.

In addition, a bearing housing having air passages and/or gaps for delivering compressed air along the bearing is provided in order to efficiently dissipate the heat, generated form rotation of the rotation shaft, from the inner surface and the outer surface of the bearing. Portions of the inner surface of the bearing retaining housing contact the outer surface of the bearing to operate as cooling fins, thus the cooling efficiency can further be improved.

Furthermore, according to one embodiment of the present invention, a compressed air source used in a rotary or turbo apparatus can also be used as a compressed air source in a cooling structure, thus an additional compressed air provider is not necessarily required.

While the present invention has been particularly shown and described with reference to exemplary or preferred embodiments thereof, it will be understood by those of ordinary skill in the art that various changes in form and details may be made therein without departing from the spirit and scope of the present invention as defined by the following claims.

What is claimed is:

1. A hydrodynamic fluid film bearing for a rotary or turbo apparatus comprising:

a sleeve having a circular inner opening for receiving a rotation shaft therein;

a plurality of foil members, each foil member having one end fixed to the inner surface of the sleeve and arranged along the inner opening of the sleeve; and a plurality of elastic members disposed at the sleeve between the sleeve and the foil member, each elastic member extending in a longitudinal direction of the sleeve and displaced with one another at intervals, and each elastic member having a viscous property to endure a shearing force applicable to the elastic member by the rotation shaft.

2. The hydrodynamic fluid film bearing of claim 1, wherein a plurality of grooves are formed at the inner surface of the sleeve, and the elastic members are affixed at the grooves.

3. The hydrodynamic fluid film bearing of claim 2, wherein a longitudinal slot is formed at each of the plurality of grooves, and the elastic members are affixed at the longitudinal slots of the grooves.

4. The hydrodynamic fluid film bearing of claim 1, wherein the elastic member has an end portion protruding toward the inner opening of the sleeve, the protruding end portion having a width smaller than a width of an opposing end portion of the elastic member fixed to the inner surface of the sleeve.

5. The hydrodynamic fluid film bearing of claim 1, wherein the plurality of foil members are arranged with portions of the foil members partially overlapping with one another.

6. The hydrodynamic fluid film bearing of claim 1, wherein the elastic member is fixed to the sleeve with a support member engaged there-between, the support member securing a lower portion of the elastic member.

7. The hydrodynamic fluid film bearing of claim 1, wherein the elastic member includes a covering member disposed on an upper surface of the elastic member.

8. The hydrodynamic fluid film bearing of claim 7, wherein the covering member is formed of an abrasion and heat resistant material.

9. The hydrodynamic fluid film bearing of claim 1, wherein the foil member is formed of metal.

10. The hydrodynamic fluid film bearing of claim 9, wherein the foil member has a generally arc shape.

11. The hydrodynamic fluid film bearing of claim 1, wherein the elastic member is formed of a polymer material, and a covering member of an abrasion and heat resistant material is disposed on an upper surface of the elastic member.

12. A hydrodynamic fluid film bearing for a rotary or turbo apparatus comprising:

a sleeve having a circular inner opening for receiving a rotation shaft therein, the sleeve including a plurality of grooves formed at the inner surface of the sleeve in a generally longitudinal direction of the sleeve;

a plurality of foil members, each foil member having one end fixed to the inner surface of the sleeve and extending along the inner opening of the sleeve in a generally arc shape; and a plurality of elastic members, each elastic member affixed at the corresponding groove of the sleeve and below the corresponding foil member, each elastic member having an upper surface protruding out from the groove and having a viscous property to endure a shearing force applicable to the elastic member by the rotation shaft, the upper surface of the elastic members coated with an abrasion and heat resistant material.

13. The hydrodynamic fluid film bearing of claim 12, wherein a longitudinal slot is formed at each of the plurality of grooves of the sleeve, and the elastic members are affixed at the longitudinal slots of the grooves.

14. The hydrodynamic fluid film bearing of claim 13, wherein the elastic members are affixed at the longitudinal slots of the grooves with a support member engaged there-between for securing a lower portion of the elastic members to the sleeve.

15. The hydrodynamic fluid film bearing of claim 13, wherein the elastic members are formed of a polymer material, and the grooves formed at the inner surface of the sleeve are cooling channels for circulating air through the groove.

* * * * *